US006865166B1

(12) United States Patent
Wilcoxson et al.

(10) Patent No.: US 6,865,166 B1
(45) Date of Patent: Mar. 8, 2005

(54) INTERFERENCE MANAGEMENT OF A PROCESSING COMMUNICATIONS SATELLITE

(75) Inventors: Donald C. Wilcoxson, Redondo Beach, CA (US); Eldad Perahia, Hermosa Beach, CA (US); Gregory S. Caso, Hermosa Beach, CA (US); David G. Klemes, Culver City, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/187,370

(22) Filed: Nov. 6, 1998

(51) Int. Cl.⁷ .......................... H04Q 7/00; H04B 7/212; H04J 3/06
(52) U.S. Cl. .................. 370/330; 370/348; 370/350; 455/446
(58) Field of Search ............................... 370/322, 347, 370/328–330, 485, 350; 455/446

(56) References Cited

U.S. PATENT DOCUMENTS

| | | | | |
|---|---|---|---|---|
| 4,052,670 A | * | 10/1977 | Watanabe et al. | 370/324 |
| 5,448,621 A | * | 9/1995 | Knudsen | 370/329 |
| 5,574,969 A | * | 11/1996 | Olds et al. | 455/429 |
| 5,615,249 A | * | 3/1997 | Solondz | 455/450 |
| 5,631,898 A | * | 5/1997 | Dent | 370/330 |
| 5,732,351 A | | 3/1998 | Olds et al. | 455/436 |
| 5,754,536 A | * | 5/1998 | Schmidt | 370/330 |
| 6,044,073 A | * | 3/2000 | Seshadri et al. | 370/342 |
| 6,240,067 B1 | * | 5/2001 | Sorber | 370/236 |
| 6,366,761 B1 | * | 4/2002 | Montpetit | 455/12.1 |
| 6,400,697 B1 | * | 6/2002 | Leung et al. | 370/328 |
| 6,516,192 B1 | * | 2/2003 | Spaur et al. | 455/450 |

FOREIGN PATENT DOCUMENTS

| | | |
|---|---|---|
| EP | 0748062 A | 12/1996 |
| EP | 0748062 | 12/1996 |
| EP | 0858177 A | 8/1998 |
| EP | 0858177 | 8/1998 |
| GB | 2321831 | 8/1998 |
| GB | 2321831 A | 8/1998 |
| WO | 9613911 | 5/1996 |
| WO | WO9613911 A | 5/1996 |

OTHER PUBLICATIONS

Communication from EPO in counterpart application.

* cited by examiner

*Primary Examiner*—Chi Pham
*Assistant Examiner*—Ronald Abelson
(74) *Attorney, Agent, or Firm*—Noel F. Heal

(57) ABSTRACT

A satellite based cellular communications system (10) for servicing multiple user terminals (14) is provided. The satellite based cellular communications system (10) includes at least one processing communications satellite (12) which supports communications uplinks (16) and communications downlinks (18) between multiple user terminals (14). A network operations center (24) having a central control processor (26) communicates with the processing communication satellite (12) on the communications uplinks (16) and the communications downlinks (18). The central control processor (26) minimizes intra-system interference between the multiple user terminals (14) by allocating a connection parameter to each user terminal (14) based upon accessing a plurality of communication system parameters.

8 Claims, 4 Drawing Sheets

Uplink Co-Channel Interference (CCI) from
ground cells which share same frequency and polarization
(all shaded ground cells share same frequency/polarization)

Downlink Co-Channel Interference (CCI) from satellite into ground cells that share the same frequency and polarization.

INTERFERENCE MANAGEMENT OF A PROCESSING COMMUNICATIONS SATELLITE

BACKGROUND OF THE INVENTION

1. Field of the Invention

This invention relates generally to a communications system and, more particularly, to a method for interference management of a processing communications satellite to reduce intra-system interference in a satellite based cellular communications system.

2. Discussion of the Related Art

In satellite based cellular communications systems, a central terrestrial control processor or network operations center (NOC) generally controls one or more communications satellites operating within the communications system. Each communications satellite within the communications system services multiple users located in multiple geographic areas known as ground cells. The communications satellites receive and transmit data signals to and from the multiple users located at the different positions within the separate ground cells in a point-to-point or point-to-multipoint manner. In a frequency division multiple access (FDMA)/time division multiple access (TDMA) communications system, signals on the same frequency, polarization and time slot are generally reused by different users within spatially separated ground cells because of bandwidth constraints, in order to increase the overall capacity of the system.

However, a disadvantage to users sharing frequency, polarization and time slots is that interference is created between the different users in the spatially separated ground cells. This interference may or may not be significant depending on the antenna beam patterns for the particular communications satellite and on the overall system design parameters. User interference may also be caused from multiple users utilizing adjacent frequencies near the boundaries between ground cells when the users are not ideally contained or restricted to their assigned frequency channels. Moreover, users assigned opposite polarizations but overlapping frequencies can also experience mutual interference since the transmit and receive antennas between the user and communications satellite cannot maintain perfect orthogonality between right-hand circularly polarized (RHCP) and left-hand circularly polarized (LHCP) signals. In addition, other orthogonality destroying effects may further be caused by rain induced depolarization of the data signals.

In general, the above-noted interference is magnified in conventional satellite based cellular communications systems. The reason for this is that conventional satellite based cellular communications systems simply assign user frequencies, polarizations and time slots based on a non-adaptive adhoc scheme. These schemes generally are performed on a first come first serve basis using only random selection of user frequencies, polarizations (if applicable) and time slots between the various users. Such conventional satellite based cellular communications systems have much greater levels of intra-system interference and thus, reduced traffic carrying capacity and reduced overall efficiency.

What is needed then is a method for interference management of a processing communications satellite which does not suffer from the above mentioned disadvantages. This will, in turn, provide a satellite based cellular communications system which utilizes intelligent frequency, polarization and time slot assignments; reduces intra-system interference; provides a communications uplink which reduces the required transmit power, terminal complexity and cost; provides a communications downlink which reduces the communications satellite size, weight and power consumption; provides a reduced cost per beam based upon the reduced satellite size, weight and power consumption; provides service to more geographic regions for a given size communications satellite; provides more traffic carrying capacity; provides greater systems revenues; and provides improved service quality to the end users. It is, therefore, an object of the present invention to provide a communications system which utilizes a method for interference management of a processing communications satellite.

SUMMARY OF THE INVENTION

In accordance with the teachings of the present invention, a satellite based cellular communications system for servicing multiple user terminals and a method for interference management of the processing communications satellite is provided. The satellite based cellular communications system minimizes intra-system interference between multiple user terminals by allocating particular connection parameters to each user terminal based upon accessing multiple communications system parameters.

In one preferred embodiment, a method for interference management of a processing communications satellite serving multiple user terminals in a satellite based cellular communications system is disclosed. The method includes receiving a request for service from a user terminal. With this request, at least one communications system parameter is accessed. Upon accessing the communications system parameter, at least one connection parameter to minimize intra-system interference based upon the one communications systems parameter accessed is determined for the user terminal. Once determined, allocation of this connection parameter to the user terminal is made. The user terminal then makes a communications connection with the processing communications satellite using the connection parameter.

In another preferred embodiment, a satellite based cellular communications system for servicing multiple user terminals includes at least one processing communications satellite. The processing communications satellite supports communications uplinks and communications downlinks between multiple user terminals. A network operations center having a central control processor communicates with the processing communications satellite on the communications uplinks and the communications downlinks. The central control processor minimizes intra-system interference between the multiple user terminals by allocating a connection parameter to each user terminal based upon accessing a plurality of communications system parameters.

In yet another preferred embodiment, a method for interference management of a communications system servicing multiple users includes receiving a request for service from a user terminal. A plurality of communications system parameters is then accessed and a frequency channel and time slot allocation to minimize intra-system interference based upon the plurality of communications system parameters is determined for the user terminal. The frequency channel and time slot are allocated to the user terminal. The user terminal thereafter makes a communications connection using the frequency channel and time slot parameter. The frequency channel and time slot parameter is periodically redetermined for the user terminal to continue to minimize intra-system interference.

The use of the present invention provides a satellite based cellular communications system for servicing multiple user terminals which uses a method for interference management of a processing communications satellite in the communications system. As a result, the aforementioned disadvantages associated with the current communications systems have been substantially reduced or eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiment concerning a method for interference management of a processing communications satellite to reduce intra-system interference in a satellite based cellular communications system is merely exemplary in nature and is not intended to limit the invention or its application or uses. Moreover, while the invention is described in detail below with respect to a satellite based cellular communications system, those skilled in the art will recognize that the method for interference management of a processing communications satellite may be used with various other centrally controlled communications systems as well.

Figure 1:
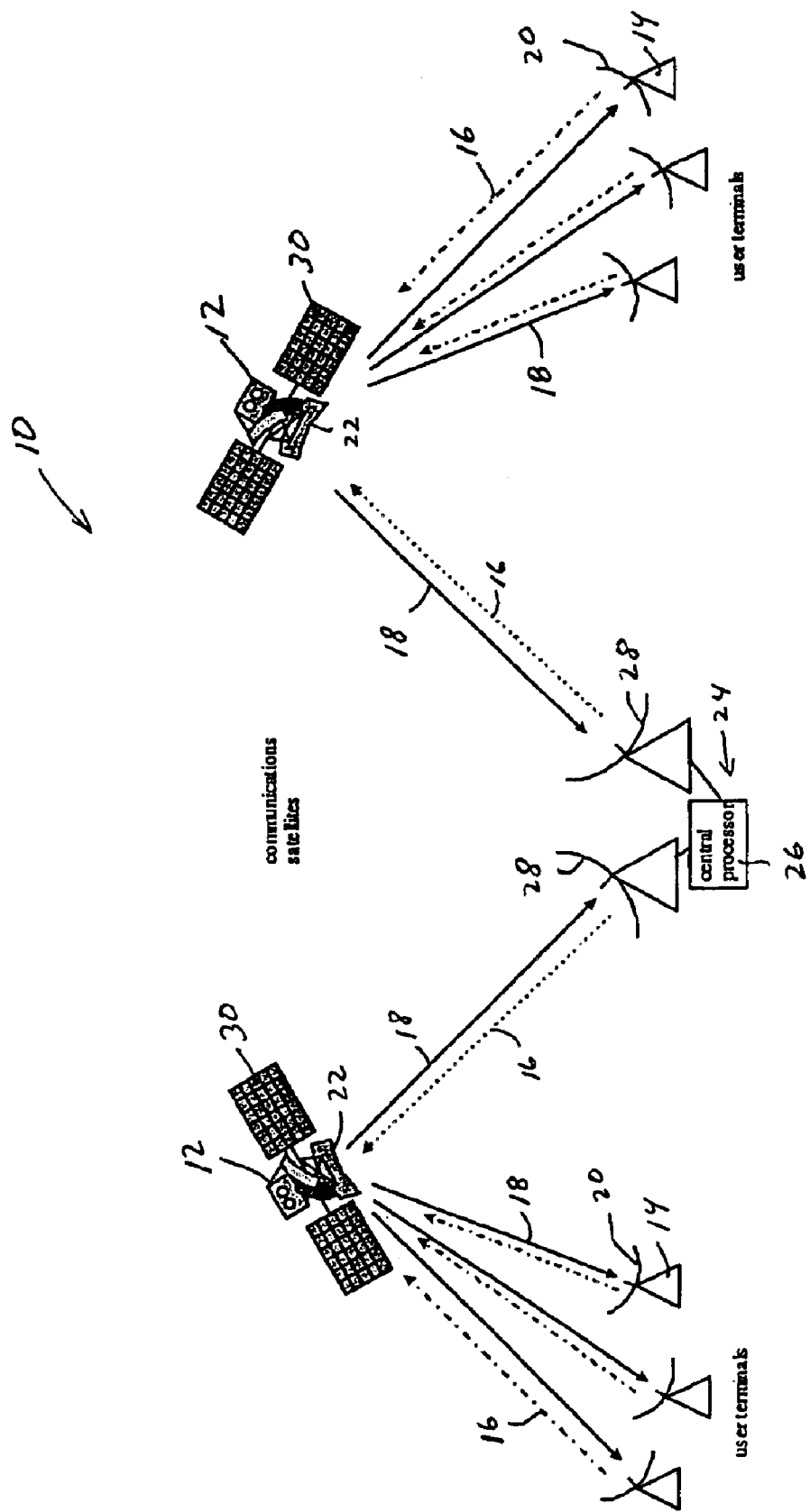
FIG. 1 is an overall satellite based cellular communications system block diagram.

Referring to FIG. 1, a satellite based cellular communications systems 10 for supporting multiple users located in multiple geographic areas or ground cells is shown. The communications system 10 includes one or more processing communications satellites. 12 operating generally in a geosynchronous orbit. Each communications satellite 12 supports multiple user terminals 14 positioned within various defined ground cells, further discussed herein. Each communications satellite 12 receives data signals from the user terminals 14 on communications uplinks 16 and transmits data signals to the user terminals 14 on communications downlinks 18. Each user terminal 14 transmits data signals on the communications uplinks 16 and receives data signals on the communications downlinks 18, via an antenna 20. Each communications satellite 12 receives and transmits the data signals on the communications uplinks 16 and the communications downlinks 18, via a multi-beam antenna 22 or any other appropriate antenna to service the required coverage region.

The satellite based cellular communications system 10 also includes a network operations center (NOC) 24 which includes a central control processor 26. The network operations center 24 generally controls the overall operations of each communications satellite 12 utilizing the communications uplink 16 and the communications downlink 18, via an antenna 28. These overall operations include maintenance of the geosynchronous orbit, positioning of solar collectors 30, initializing satellite system parameters, user billing, as well as other operational controls which are all well known in the art. The central control processor 26 of the network operations center 24 is preferably a general purpose programmable computer, a current example of which is a Sun Microsystems computer, or any other appropriate computer depending on the computational power required. The central control processor 26 also controls the interference management of each processing communications satellite 12 to reduce intra-system interference in the satellite based cellular communications 10 according to the teaching of the preferred embodiment of the present invention.

Figure 2:
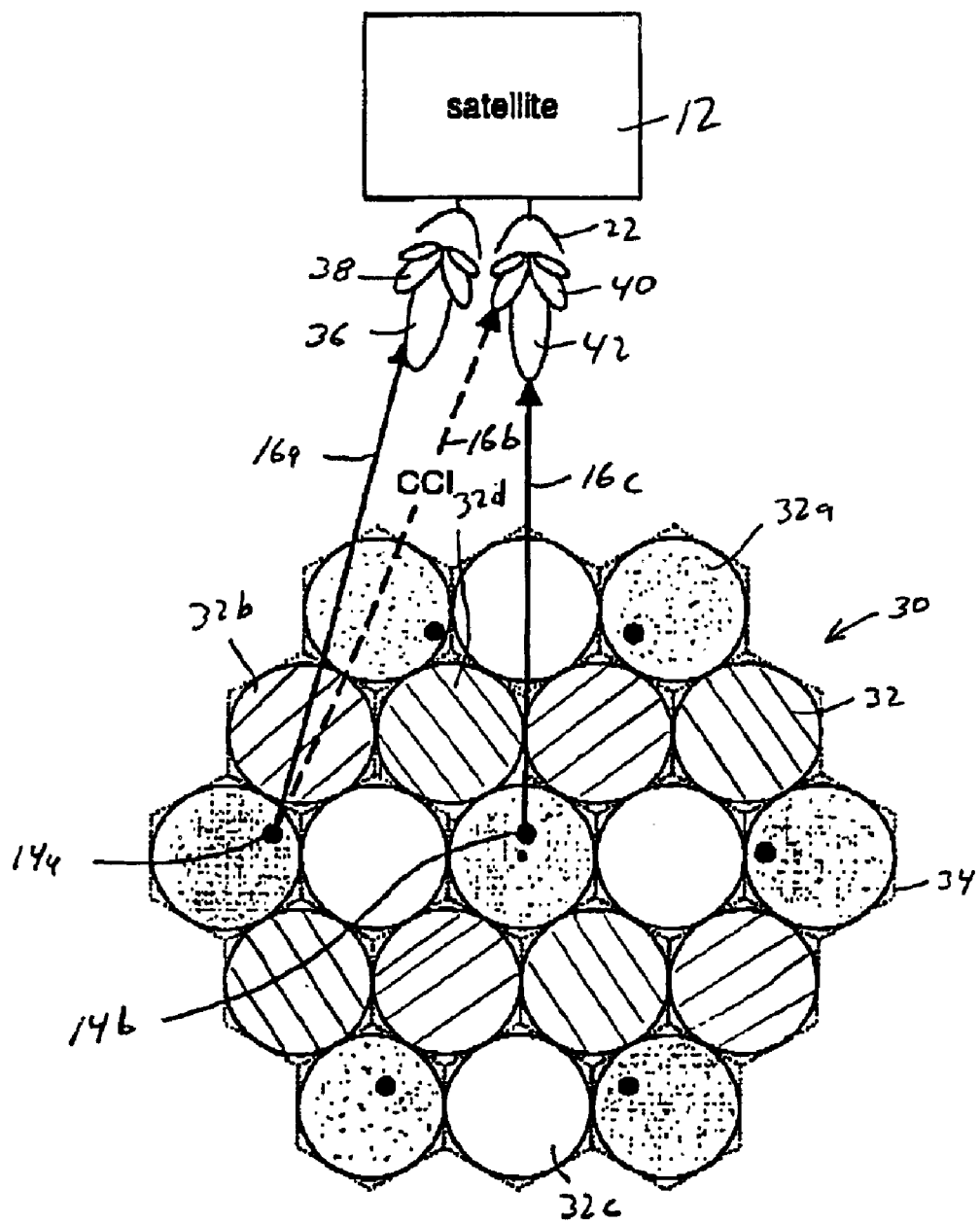
FIG. 2 is a detailed block diagram of a communications uplink between user terminals positioned within multiple ground cells and a processing communications satellite.

Referring now to FIG. 2, a communications uplink 16a between a user terminal 14a and a processing communications satellite 12 is shown operating when no interference management is being performed. The communications satellite 12 services the coverage region 30 which includes multiple ground cells 34 represented by each hexagonal region. Each of the ground cells 34 is represented by a hexagonal shaped region 34 which are the regions each individually illuminated by one antenna beam from the multi-beam antenna 22 on the communications satellite 12. The coverage region 30 is shown utilizing what is known as a 4-to-1 re-use where the coverage region 30 is separated into one of four types of ground cells 32a–32d. Each of the ground cells 34 having the same shading operate within the same frequency band. Within each particular frequency band, many different frequency channels are available to user terminals 14 operating within these ground cells 34. For example, each of the ground cells 32a may be allocated a first 100 MHz frequency band that is divided into 175 frequency channels. In this way, the user terminal 14a within the ground cell 32a is allocated one of the 175 frequency channels and at least one of the time slots allocated to that particular channel. Similarly, each of the ground cells 32b may be allocated a second 100 MHz frequency band, each of the ground cells 32c may be allocated a third 100 MHz frequency band, and each of the ground cells 32d may be allocated a fourth 100 MHz frequency band. Therefore, in this example, a 400 MHz frequency band is split into four different 100 MHz frequency bands where each group of ground cells 32a–32d is allocated one of the four different 100 MHz frequency bands, each containing 175 separate frequency channels and multiple time slots. In other words, all of the ground cells identified as 32a will be operated within the same 100 Mhz frequency band having the same 175 frequency channels available and so forth throughout each set of ground cells 34 within the coverage region 30.

Referring again to FIG. 2, user terminal 14a in ground cell 32a is operating within the first 100 MHz frequency band and say, for example, channel one within this 100 MHz frequency band. User terminal 14a is also bursting on and off within a particular time slot for channel one within the 100 MHz frequency band. User terminal 14a may also use additional channels within the 100 MHz frequency band and/or additional time slots depending on how much bandwidth the user terminal 14a requires to transmit all its data, via the communications uplink 16a. The communications uplink 16a originating from user 14a is directed into a main beam 36 of the multi-beam antenna 22 that is servicing ground cell 32a. Main beam 36 also includes multiple sidelobes 38.

Secondary energy or co-channel interference (CCI) 16b is also shown originating from user terminal 14a. The co-channel interference 16b is received in the sidelobes 40 of main beam 42 which services the other central ground cell 32a where user terminal 14b is located. The reason that the co-channel interference 16b occurs is because the multi-beam antenna 22 for the communications satellite 12 is not able to control its reception characteristics perfectly. In other words, the user terminal 14a is transmitting energy to at least both the main beam 36 and the sidelobes 40 of the multi-beam antenna 22. This energy is coming into the sidelobes 40 at a lower power level, but this lower power level is still seen as interference to the user terminal 14b and its communications uplink 16c. This interference is created by re-use of the same frequency band, channel and time slot by user terminals 14a and 14b. It should further be noted that additional uplink co-channel interference 16b may be created with other users operating within other ground cells 32a which utilize the same frequency band, channel and time slots as the user terminals 14a and 14b. This interference and signal degradation is what the interference management procedure minimizes.

Figure 3:
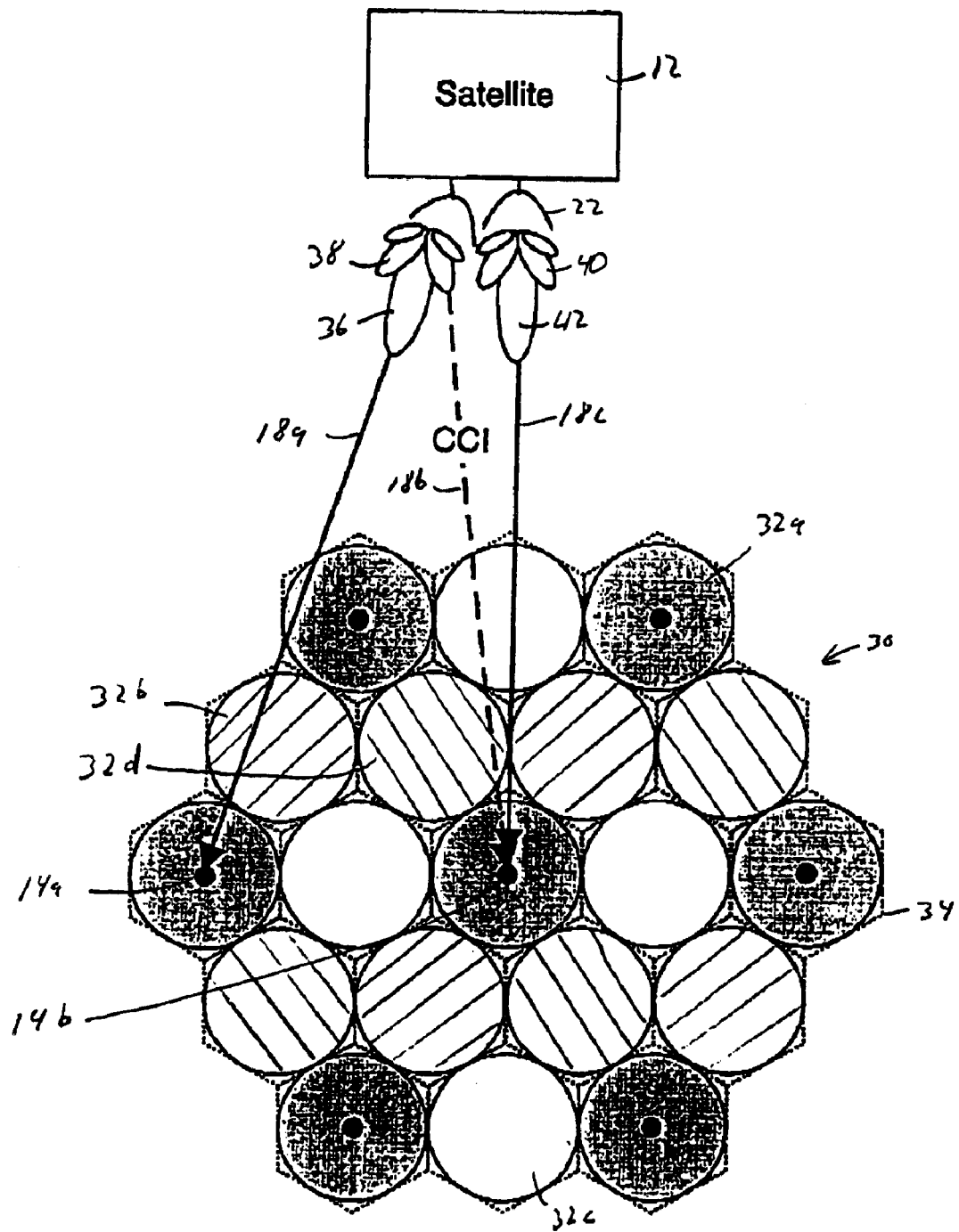
FIG. 3 is a detailed block diagram of a communications downlink between the processing communications satellite and the user terminals positioned within the multiple ground cells.

Referring now to FIG. 3, downlink co-channel interference (CCI) 18b from a communications downlink 18a between the communication satellite 12 and user terminals 14a and 14b is shown. In general, each of the communications downlinks 18 from the communications satellite 12 to the multiple user terminals 14 within each group of ground cells 32a–32d operate on a single carrier frequency, however this carrier may or may not be gated off at specified times. In other words, all of the ground cells 32a operate on a first carrier frequency, all of the ground cells 32b operate on a second carrier frequency and so forth. The reason for the single carrier frequency being used for each group of ground cells 32a–32d is because of the limited power constraints associated with operating the communications satellite 12. Accordingly, since communications downlink 18a and 18c are operating with the same carrier frequencies, co-channel interference 18b is generated from sidelobes 38 of main beam 36 which are received by user terminal 14b, when both carriers are gated on at the same time.

Figure 4:
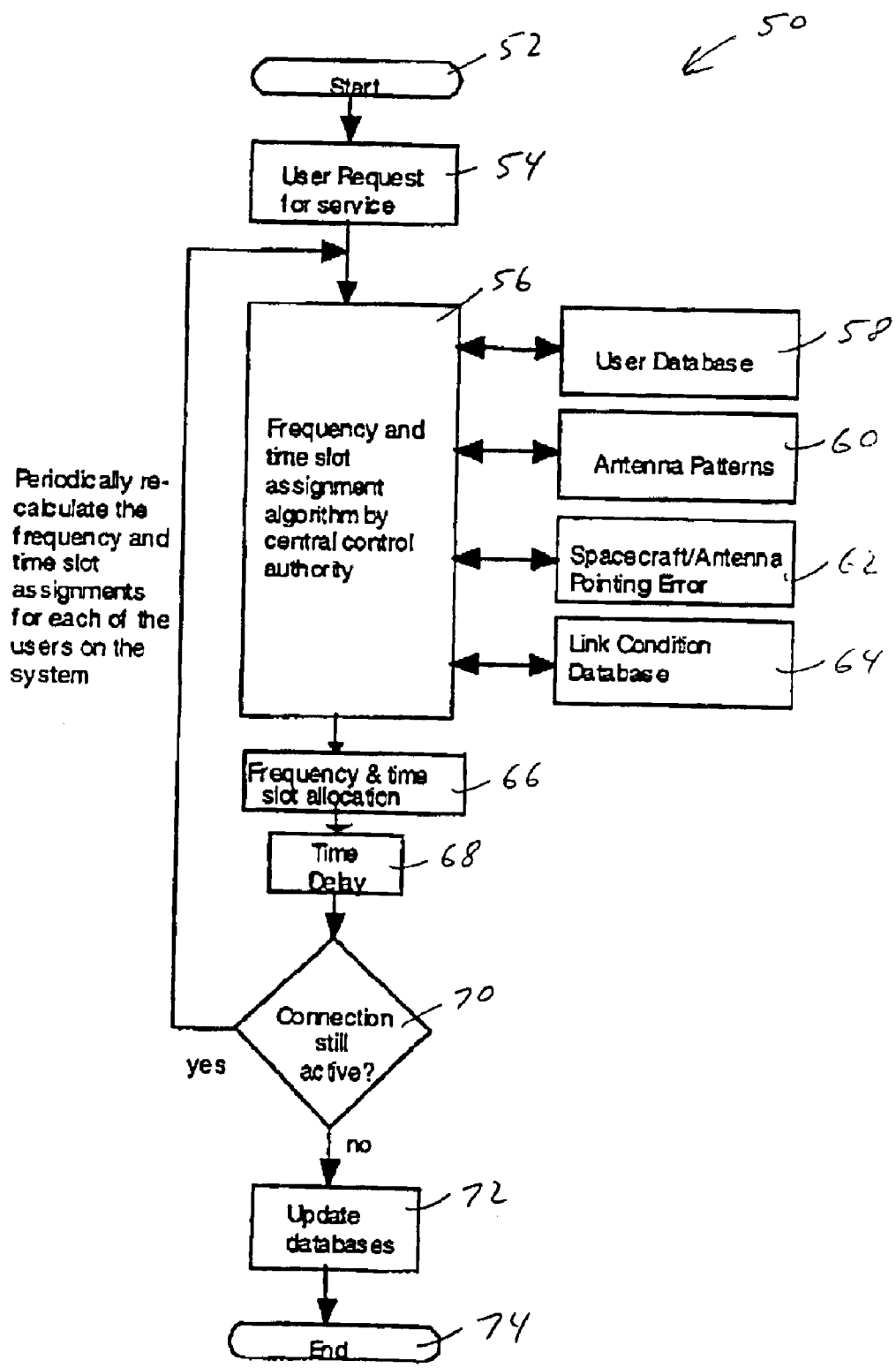
FIG. 4 is a detailed flow diagram of a method for interference management of a processing communications satellite according to the teachings of the present invention.

In order to minimize or eliminate communications uplink co-channel interference 16b and communications downlink co-channel interference 18b, an adaptive intelligent interference management method will be performed by the central control processor 26 in the network operations center 24. With reference to FIG. 4, a detailed flow chart on this method or routine 50 for interference management of the processing communications satellite 12 within the satellite based cellular communications system 10 is shown. The routine 50 begins with start block 52 where the routine 50 is initialized within the central control processor 26. Once initialized, the routine 50 then enters the user request for service block 54 where either a single user terminal 14 or multiple user terminals 14 request service. These requests are transmitted through a dedicated channel on the communications uplink 16 which is received by the communications satellite 12 and transferred to the network operations center 24 on the communications downlink 18 for processing by the central control processor 26.

Each user terminal 14 requesting service will provide its user ID which will identify the physical location of the user terminal 14 within the ground cell 34, the bandwidth required by the user terminal 14 to transmit all of its data, the type of user terminal 14 or priority of the user terminal 14 depending upon its fee schedule, and how much error correction encoding the user terminal 14 intends to be performing to provide an indication as to how much interference the user terminal 14 can handle. Once the user terminal 14 or multiple user terminals 14 make a request for service 54, the routine 50 steps to a parameter assignment block 56t which determines appropriate connection parameter assignments for each user terminal 14 to minimize interference for all the active user terminals 14 based upon various known input communications system parameters. These connection parameter assignments 56 may include setting the frequency channel, time slot, polarization, error correction encoding level, and power level allocations for each user terminal 14.

The known input communications system parameters which may be accessed by the parameter assignment block 56 are user database parameters 58, antenna pattern parameters 60, spacecraft/antenna pointing error parameters 62 and link condition database parameters 64. The user database parameters set forth in block 58 identify all of the current user terminals 14 active in the communications system 10, including where in each ground cell 34 the user terminals 14 are located, what frequencies and time slots the user terminals 14 are operating on, the power levels transmitted by the user terminals 14, the error correction encoding used by each terminal 14, and the particular class of each user terminal 14 based upon fee schedule priorities.

The antenna pattern parameters set forth in block 60 identify the illumination patterns from the multi-beam antenna 22 positioned on the communications satellite 12. These illumination parameters include positioning of the individual main beams which service each ground cell 34, as well as the positioning of the sidelobes for each of these main beams.

The spacecraft/antenna pointing error parameters in block 62 set forth any antenna offset errors which may occur due to movement of the multi-beam antenna 22 during the geosynchronous orbit of the communications satellite 12. In other words, thermal effects, solar effects and solar wind may cause the communications satellite 12 to slightly move, shift, or rotate in its geosynchronous orbit, thereby causing the multi-beam antenna 22 to illuminate each ground cell 34 slightly off its desired pattern.

The link condition database parameters in block 64 identify the physical conditions between each active user terminal 14 in the communications system 10 and the communications satellite 12. These conditions include any adverse weather conditions, such as rain which may create attenuation of the uplink or downlink signals. These link condition database parameters 64 are generally provided to the communications satellite 12 from each user terminal 14 based upon the user terminal 14 monitoring its current link condition and periodically sending these parameters to the central control processor 26 in the network operations center 24, via a communications uplink 16 and a communications downlink 18 through communications satellite 12.

Each of the connection system parameters set forth in the user database 58, antenna patterns 60, spacecraft/antenna pointing error 62 and link condition database 64 are generally stored in a central memory location that is accessed by the central control processor 26. The central control processor 26 will perform the connection parameter assignments 56 based upon the particular assignment algorithm utilized by the parameter assignment block 56.

One of the least computationally-intensive assignment algorithms which may be utilized by the parameter assignment block 56 is based upon using a single input communications system parameter from the user database 58 directed to where each active user terminal 14 is currently operating. This assignment algorithm will essentially compare all the current frequency channels and time slots that are active and determine the distance between any two user terminals 14, whereby the parameter assignment block 56 would select the appropriate frequency channel and time slots for each user terminal 14 to provide the maximum distances between user terminals 14 operating on the same frequency channel and time slot. Such an assignment algorithm may readily, be constructed by those skilled in the art. In this way, the user terminals 14 requesting service 54 would be allocated the appropriate frequency channel and time slot connection parameters based upon where each active user terminal 14 is located. This frequency channel and time slot allocation is made by the central control processor 26 and occurs at the frequency and time slot allocation block 66. Once the connection parameter allocation is made by the central control processor 26, there is a time delay 68 which occurs because of the transfer time required to transfer the parameter allocations to the particular user terminals 14, via communications uplink 16 and communications downlink 18 through communications satellite 12.

After the time delay 68, the user terminals 14 which have been allocated their particular connection parameters, such as the frequency channel and time slot, now make their communication connections and begin data transfers under these connection parameters. The routine 50 then steps to decision block 70 which determines whether or not the connection is still active for the particular user terminals 14 which have been allocated their frequency channel and time slots. Should the connection no longer be active, the routine steps to the update database block 72 which updates the user database 58, antenna patterns 60, spacecraft/antenna pointing error 62 and link condition database 64 to identify that the particular user terminal 14 is no longer active in the communications system 10. Thereafter, routine 50 subsequently steps to the end block 74 and ends the routine 50 for the particular user terminals 14.

Should the connection still remain active 70, the routine 50 then returns to the parameter assignment block 56 in order to recalculate frequency channel and time slot assignments for each of the user terminals 14 active on the system, based upon any updated parameters set forth in the user database 56, antenna pattern 60, spacecraft/antenna pointing error 62 and link condition database 64 which may have changed during the active connection 70.

Should additional computational power be available in the central control processor 26, more detailed assignment algorithms may be used to provide the adaptive intelligent connection parameter assignments 56 which are selected on a deterministic controlled fashion using additional connection system parameters from blocks 58–64. For example, the assignment algorithm may also take into account the distances between the active user terminals 14 and the known antenna patterns from antenna pattern block 60. In this way, the assignment algorithm will actually calculate what type of interference may occur by allocating particular frequency channels and time slots for the particular user terminals 14 in light of the antenna patterns from the multi-beam antenna 22 positioned on the communications satellite 12. This calculation is based upon where the main beams and sidelobes would be located relative to the user terminals 14. Moreover, should further accuracy in this determination be desired, the spacecraft/antenna pointing error 62 may be taken into account to get a more accurate interference mapping based upon corrected antenna pattern parameters 60.

Other assignment algorithms may also take into account the link condition database parameters 64 which identify whether or not any of the requesting user terminals 14 and active user terminals 14 are operating in a communications link through severe weather. Frequency channel and time slot allocations may also take into account the priority of the particular user terminal 14 directed to what fees the user terminal 14 is, in fact, paying relative to other user terminals 14. Each of these assignment algorithms may be readily constructed by those skilled in the art depending upon the computational power available for the particular communications system 10.

The above description of the routine 50 generally relates to assigning communications uplinks 16 for the various user terminals 14 in an FDMA/TDMA communications uplink. Should a communications downlink 18 be utilized where the communications downlinks 18 operate at different frequencies and time slots similar to the communications uplinks 16, the routine 50 for the communications downlink 18 is substantially the same. Should the communications downlink 18 operate, as shown in FIG. 3, such that a single carrier frequency is used for each particular set of ground cells 34, the parameter assignment block 56 may allocate communication downlinks 18 on a time varying basis such that the frequency and time slot allocation block 66 will simply be replaced with a time varying parameter allocation block 66 or any other appropriate connection parameter allocation. In other words, referring to FIG. 3, should the same carrier frequency be utilized for the communication downlink 18*a* and the communication downlink 18*c*, a time allocation may be set between user terminals 14*a* and 14*b* such that the communication downlink 18*a* is on for a certain period of time and off when communication downlink 18*c* is on, thereby eliminating a co-channel interference 18*b* between user terminals 14*a* and 14*b*.

The routine 50 for interference management of the various communications satellites 12 minimizes or eliminates intra-system interference within the communications system 10 by using an adaptive intelligent connection parameter allocation for each user terminal 14 based upon at least one communication system input parameter, such as user terminal locations. Should further interference minimization be desired, additional known input parameters may be accessed by the parameter assignment block 56 from the user database parameters 58, antenna pattern parameters 60, spacecraft/antenna pointing error parameters 62 and link condition database parameters 64 with the only limiting constraint being the amount of computational power available in the central control processor 26. This computational power will vary depending on whether a general purpose computer, such as a Sun Microsystems computer, is utilized versus a mainframe computer or supercomputer. Any of the noted assignment algorithms may then be readily prepared by someone skilled in the art based upon the computational power available and the desired interference minimization required between user terminals 14.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for interference management of a processing communications satellite serving multiple user terminals in a satellite based cellular communications system using a combination of frequency-division and time-division multiple-access, said method comprising:

receiving a request for service from a user terminal;

prioritizing the multiple user terminals according to selected criteria, wherein said selected criteria include an amount of error correction selected by the user terminal;

accessing a database of communications system parameters including user terminal database parameters having a prioritization listing, antenna pattern parameters, spacecraft/antenna pointing error parameters and link condition database parameters;

applying an algorithm to at least one communications system parameter from the database of communications system parameters to determine a connection parameter to minimize intra-system interference in part upon the database of communications system parameters for the user terminal;

allocating the connection parameter to the user terminal; and making a communications connection with the processing communications satellite by the user terminal using the connection parameter.

2. The method a defined in claim 1 further comprising monitoring to determine whether the communications connection is still active.

3. The methods defined in claim 2 further comprising redetermining the connection parameter for the user terminal based upon an updated database of communications system parameters.

4. The method as defined in claim 1 wherein the connection parameter is a frequency channel.

5. The method as defined in claim 1 wherein the connection parameter is a time slot.

6. The method as defined in claim 1 further comprising updating the database of communications system parameters after the communication connection ends.

7. The method of claim 1, wherein said selected criteria include a bandwidth selected by the user terminal.

8. The method of claim 1, wherein said selected criteria include a fee schedule of the user terminal.

* * * * *